(No Model.) 2 Sheets—Sheet 1.

J. C. HARLACKER & S. W. OYSTER.
LIQUID DRAINER.

No. 248,647. Patented Oct. 25, 1881.

Witnesses;
H. B. Applewhaite
Warren Parsons

Inventor;
John C. Harlacker
Simon W. Oyster
per Attys.
A. H. Evans & Co (No Model.) 2 Sheets—Sheet 2.

J. C. HARLACKER & S. W. OYSTER.
LIQUID DRAINER.

No. 248,647. Patented Oct. 25, 1881.

Witnesses:
H. B. Applewhaite
Warren Parsons

Inventors,
John C. Harlacker
Simon W. Oyster
Per Attys. A. H. Evans & Co.

UNITED STATES PATENT OFFICE.

JOHN C. HARLACKER AND SIMON W. OYSTER, OF HARRISBURG, PA.

LIQUID-DRAINER.

SPECIFICATION forming part of Letters Patent No. 248,647, dated October 25, 1881.

Application filed August 25, 1881. (No model.)

*To all whom it may concern:*

Be it known that we, JOHN C. HARLACKER and SIMON W. OYSTER, of Harrisburg, Pennsylvania, have invented a new and useful Improvement in Liquid-Drainers for Draining Liquids from Barrels and other Vessels, of which the following is a full, clear, and exact description, reference being had to the accompanying drawings, making a part of this specification, in which—

Figure 1:
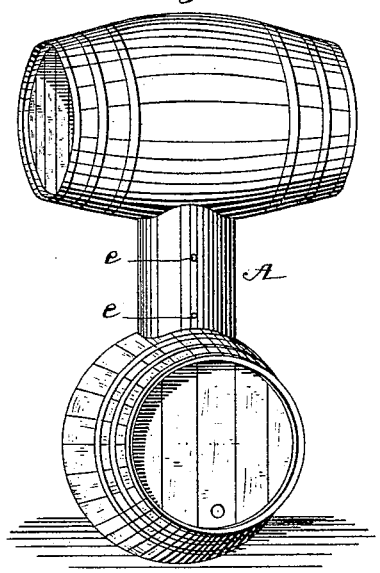
Figure 2:
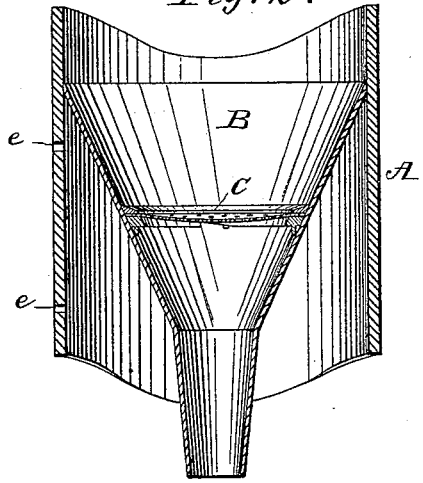
Figure 3:
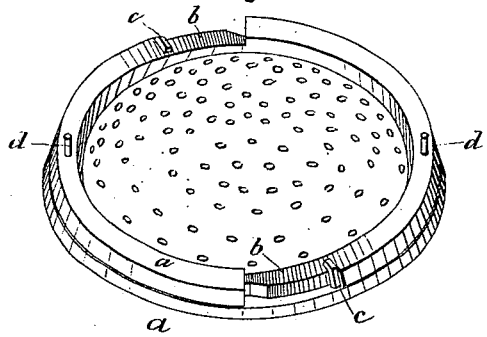
Figure 3:
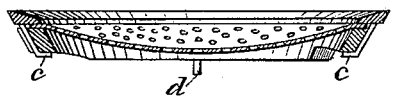
Figure 3:
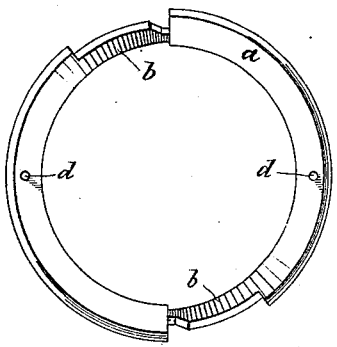
Figure 3:
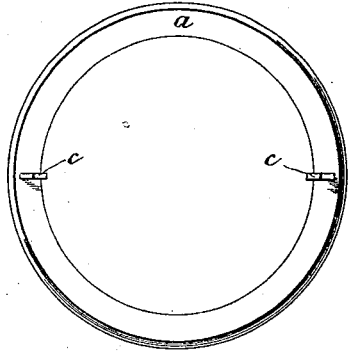

Figure 1 is a perspective view of our improved drainer as applied. Fig. 2 is a vertical section of the same. Fig. 3 is detached views of strainer.

The object of our invention is to drain molasses, oils, and other liquids from one barrel or vessel into another without loss or labor; and it consists in the combination of devices hereinafter described and claimed.

It is well known that in emptying molasses, oils, and other liquids from barrels it requires considerable time to drain out the liquid, which has usually been done by draining them first into buckets or other vessels, and then transferring the drainage through funnels into any desired barrel or other vessel. The main purpose of our invention is to avoid this labor and its attending loss.

To enable others skilled in the art to make and use our invention, we will proceed to describe the exact manner in which we have carried it out.

In the drawings, A represents a vessel, made of any suitable material, preferably of cast-iron, grooved at the bottom to fit the curvature of the barrel into which the liquid is to be transferred, while on the top is made a similar groove to fit the curvature of the vessel to be drained. By this construction we are enabled to place the one barrel above the other with the bungs opposite, the vessel A being interposed between them.

Inside of the vessel A, and rigidly attached thereto, we fit the funnel B, as shown in Fig. 2, the spout of which extends below vessel A, so as enter the bung-hole of the lower barrel. It is evident, from this description, the barrel to be drained has only to be placed upon vessel A when in position on the lower barrel, and there allowed to remain a sufficient time to be completely drained of all of its liquid contents.

In many cases—such, for instance, as in draining molasses, oils, vinegar, &c.—it may become necessary to interpose a strainer to arrest the passage of impurities, and for this purpose we have constructed the strainer C, provided with a sectional ring, as shown in Fig. 3, fitting into the funnel B, by which arrangement the strainer becomes readily removable when desired. The strainer to be used should be adapted to the character of the liquid to be strained. To this end we have constructed a novel strainer provided with sectional rings $a\ a$, between which are held the strainers. These rings are readily attached or detached by means of the cams $b\ b$ and pins $c\ c$, so that when it becomes necessary to change the character of the strainer (coarse or fine) it is only required to detach the sections $a\ a$, remove the strainer, and introduce one suited to the material to be strained.

On the lower face of the ring of the strainer we place two projecting pins, $d\ d$, which fit into perforations $e\ e$, made in the side of the vessel A. When it is desired to detach or fasten the sections of the ring it is only necessary to place the pins $d\ d$ in the holes $e\ e$, when a wrench is formed by which the fastening or separating is readily accomplished.

Having thus explained our invention, what we claim to be new, and desire to secure by Letters Patent, is—

1. The vessel A, provided with the grooves at top and bottom, as described, in combination with the rigidly-attached funnel B, substantially as and for the purpose set forth.

2. The vessel A, constructed as described, in combination with the rigidly-attached funnel B and strainer C, substantially as and for the purpose set forth.

3. The sectional strainer-rings $a\ a$, provided with cams $b\ b$, pins $c\ c$ and $d\ d$, in combination with a strainer, subtantially as and for the purpose set forth.

JOHN C. HARLACKER.
SIMON W. OYSTER.

Witnesses:
WM. R. GEORGAS,
WM. B. IRWIN.